Dec. 29, 1936.  P. B. HARWOOD  2,066,106
MOTOR CONTROL SYSTEM
Filed July 25, 1935
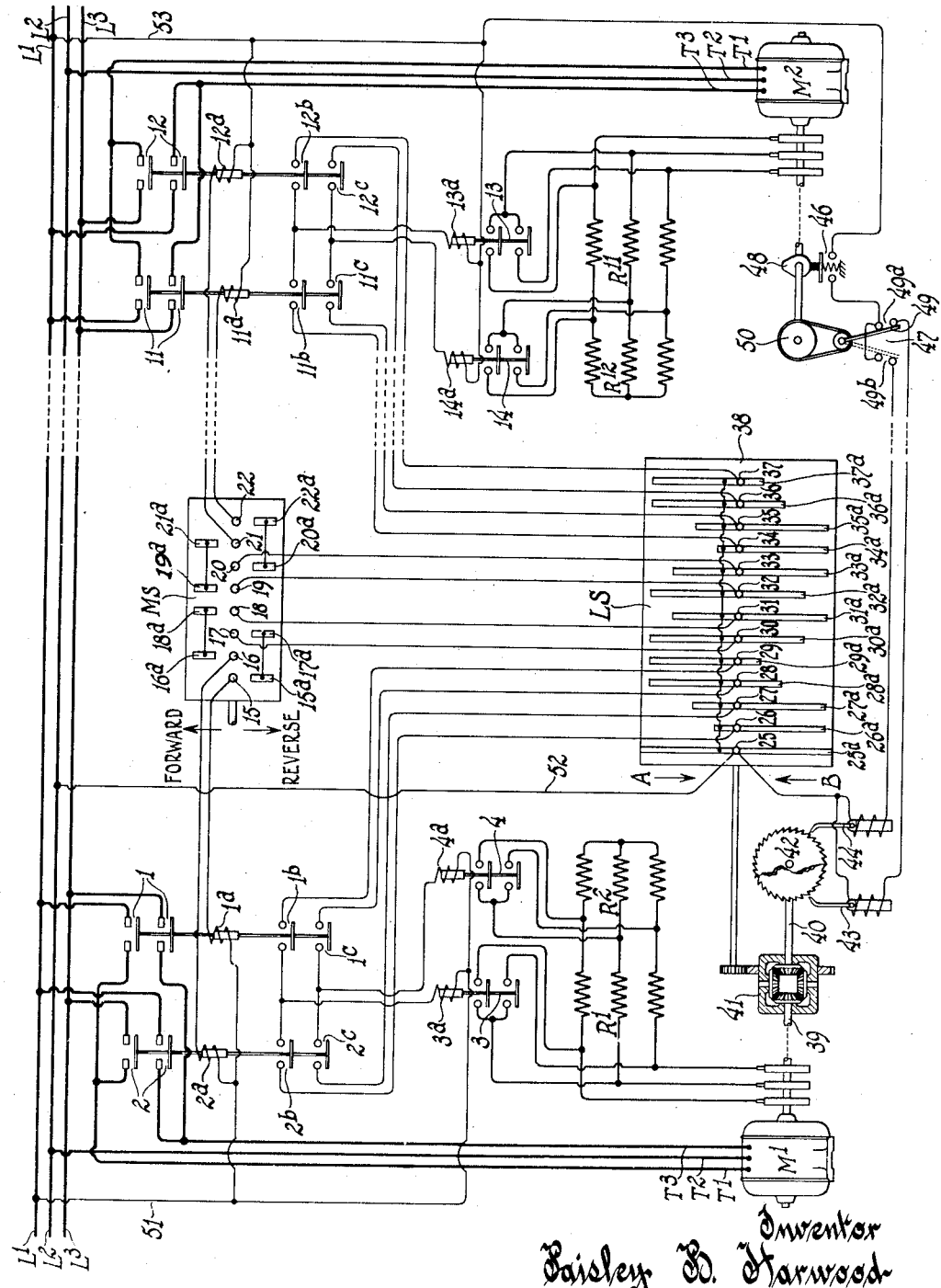
Inventor
Paisley B. Harwood
By Frank H. Hubbard
Attorney Patented Dec. 29, 1936

2,066,106

UNITED STATES PATENT OFFICE 2,066,106

MOTOR CONTROL SYSTEM

Paisley B. Harwood, Milwaukee, Wis., assignor to Cutler-Hammer, Inc., Milwaukee, Wis., a corporation of Delaware Application July 25, 1935, Serial No. 32,981

4 Claims. (Cl. 172—293)

This invention relates to motor control systems, and more particularly to controllers for synchronizing the operation of associated motor driven devices.

It is frequently necessary to control the speed of two motors so that the number of revolutions of either motor per unit of time will always be substantially equal to or be the same multiple of the number of revolutions of the other motor. The present invention has among its objects to provide an improved and simplified controller for installations of this character employing only electric wiring as a physical connection between the motors to effect the required control thereof.

Another object is to provide a reversing controller of the aforesaid character including manual control means for starting the motors simultaneously and automatic control means for controlling the speed of the motors to provide for synchronous operation thereof.

Another object is to provide a controller of the aforesaid character which requires only a relatively small number of control wires between the motors.

Another object is to provide a synchronizing controller which is simple and rugged in construction, and positive and reliable in operation.

Various other objects and advantages of the invention will hereinafter appear.

The accompanying drawing schematically and diagrammatically illustrates a control system embodying the invention which will now be described, it being understood that the system illustrated is susceptible of modification without departing from the spirit and scope of the appended claims.

Referring to the drawing, the same illustrates a pair of three phase alternating current motors $M^1$ and $M^2$ and a supply circuit therefor indicated by lines $L^1$, $L^2$ and $L^3$. Said motors are of the slip ring type and each has two sets of speed regulating resistances connected in the secondary circuit thereof, the sets of resistances associated with motor $M^1$ being designated by reference characters $R^1$ and $R^2$, and the sets of resistances associated with motor $M^2$ being designated by reference characters $R^{11}$ and $R^{12}$.

The primary circuit of motor $M^1$ is controlled by a pair of electromagnetically operated reversing switches 1 and 2 and the primary circuit of motor $M^2$ is controlled by a pair of electromagnetically operated reversing switches 11 and 12. Also electromagnetically operated switches 3 and 4 are provided for shunting the sets of resistances $R^1$ and $R^2$, and electromagnetically operated switches 13 and 14 are provided for shunting the sets of resistances $R^{11}$ and $R^{12}$.

The two pairs of reversing switches 1—2 and 11—12 are manually controlled by a master switch MS and said reversing switches and the resistance control switches 3—4 and 13—14 are automatically controlled by a limit switch LS. Master switch MS is provided with stationary contacts 15, 16, 17 and 18 having cooperating movable contacts $a$ for selectively controlling the reversing switches 1 and 2, and the same is also provided with stationary contacts 19, 20, 21 and 22 having cooperating movable contacts $a$ for selectively controlling reversing switches 11 and 12. Limit switch LS is provided with stationary contacts 25 to 37, inclusive, and cooperating movable contact segments $25^a$ to $37^a$ which are electrically connected and mounted upon a rotatable drum 38.

Drum 38 is mechanically connected to shafts 39 and 40 through the medium of differential gear set 41 which may be of any well known type. Shaft 39 is driven by motor $M^1$ and an electromagnetically operated ratcheting mechanism 42 under the control of motor $M^2$ is provided for driving shaft 40. Said ratcheting mechanism includes a pair of solenoid operated pawls 43 and 44, which cooperate with ratchet wheels fixed to shaft 40 to provide for operation of said shaft in opposite directions selectively.

The energizing circuits for the pawls 43 and 44 are controlled by switches 46 and 47 associated with motor $M^2$. Switch 46 is biased to open position and is adapted to be closed by a cam 48 driven by motor $M^2$. Switch 47 has a movable contact arm 49 which is driven by motor $M^2$ through the medium of a friction device 50 to provide for engagement thereof with associated contacts $a$ upon an operation of said motor in one direction, and with associated contacts $b$ upon operation of said motor in an opposite direction.

The function and operation of the aforedescribed system and also the circuit connections thereof will now be more fully described.

Limit switch LS is normally in the position shown in the drawing, and upon movement of master switch MS into its forward position reversing switch 1 is energized by a circuit extending from line $L^1$ by conductor 51, through the operating winding $1^a$ of said reversing switch, through contacts 15, $15^a$, $17^a$ and 17 of said master switch, through contacts 30, $30^a$, $25^a$ and 25 of said limit switch, and by conductor 52 to line $L^2$. Also reversing switch 11 is energized by a circuit extending from line L¹ by conductor 53 through the operating winding 11a of said reversing switch through contacts 22, 22a, 20a and 20 of the master switch, through contacts 33, 33a, 25a and 25 of limit switch LS and by conductor 52 to line L². As is apparent, upon response of reversing switches 1 and 11 terminals T¹, T² and T³ of the motors M¹ and M² are respectively connected to lines L¹, L² and L³, and it is assumed that said motors then operate in their forward direction.

Reversing switch 1 in responding establishes an energizing circuit for resistance control switch 3 extending from line L¹ through its operating winding 3a, through auxiliary contacts 1b of said reversing switch and through contacts 29, 29a, 25a and 25 of limit switch LS to line L². Also upon response of reversing switch 1 an energizing circuit for resistance control switch 4 is established extending from line L¹ through its operating winding 4a, through auxiliary contacts 1c of said reversing switch and through contacts 28, 28a, 25a and 25 of limit switch LS to line L². Reversing switch 11 in responding establishes an energizing circuit for resistance control switch 13 extending from line L¹ through its operating winding 13a through auxiliary contacts 11b associated with reversing switch 11 and through contacts 34a, 34, 25a and 25 to line L². Also upon response of reversing switch 11 resistance control switch 14 is energized by a circuit extending from line L¹ through its operating winding 14a, through auxiliary contacts 11c associated with said reversing switch and through contacts 35a, 35, 25a and 25 of limit switch LS to line L². Thus upon movement of master switch MS into its forward position the motors are simultaneously started in forward direction and the steps of resistance R¹, R², R¹¹ and R¹² are shunted for operation of said motors at full speed.

During forward operation of motor M² switch 46 is periodically closed and opened, and assuming that the arm 49 of switch 47 engages its associated contacts 49a during forward operation of said motor, the solenoid operated pawl 43 is periodically energized by a circuit extending from line L¹ by conductor 53 through switch 46, through contacts 49a of switch 47, to and through the operating winding of said pawl and by conductor 52 to line L². Shaft 40 of the differential gear set 41 is thus driven in a step by step manner and the arrangement is such that said shaft is driven in one direction upon forward operation of motor M² while shaft 39 of said gear set is continuously driven in an opposite direction during forward operation of motor M¹. Assuming that the ratcheting mechanism is so designed that the angular movement of shaft 40 for a given number of revolutions of motor M² corresponds to the angular movement of shaft 39 for a like number of revolutions of motor M¹, it is apparent that during forward operation of both motors at the same speed the drum 38 of limit switch LS will be alternately moved out of normal position in one direction, as for example in the direction of arrow B by motor M¹ and returned to normal position in the direction of arrow A by motor M². However, with both of the motors operating at the same speed the drum of limit switch LS is not moved sufficiently to effect interruption of any of the circuits controlled thereby.

Assuming that the speed of motor M² is reduced for any reason during forward operation of the motors, it is apparent that the limit switch LS will at once be moved in the direction of arrow B to disengage contacts 29 and 29a for deenergization of switch 3. Switch 3 is thus opened to include the set of resistances R¹ in the secondary circuit of motor M¹ for slowdown of said motor. If this does not reduce the speed of motor M¹ sufficiently to bring the same into step with motor M² limit switch LS is moved still further in the direction of arrow B to disengage contacts 28 and 28a for deenergization of switch 4. Switch 4 then opens to include the set of resistances R² in the secondary circuit of motor M² to effect a further reduction in the speed of said motor. If this second speed reduction of motor M¹ is not sufficient to bring the same into step with motor M² movement of the limit switch LS is continued in the direction of arrow B whereupon contacts 30 and 30a are disengaged to deenergize switch 1. The power connections for motor M¹ are thus interrupted and said motor then coasts until the speed thereof is below that of motor M² whereupon limit switch LS is returned in the direction of arrow A to re-engage contacts 30 and 30a for energization of switch 1. It is thus apparent that if the speed of motor M¹ is not reduced sufficiently by the sets of resistance R¹ and R² to bring the same into step with motor M² the supply circuit for motor M¹ is periodically interrupted and re-established by limit switch LS to cause said motor to operate substantially in step with motor M². On the other hand, it is apparent that if motor M¹ tends to operate at a lower speed than motor M² upon inclusion of one or both of the sets of resistances R¹—R² the limit switch LS will be operated in the direction of arrow A to exclude said resistances and thereby increase the speed of motor M¹.

The controller also operates in a manner similar to that hereinbefore described when it is necessary to reduce the speed of motor M² to maintain the same in step with motor M¹.

Assuming that the speed of motor M¹ is reduced for any reason during forward operation of the motors, the limit switch LS will at once be moved in the direction of arrow A to disengage contacts 34 and 34a. Switch 13 is thus deenergized to include the set of resistances R¹¹ in the secondary circuit of motor M² for slowdown of said motor. If this does not reduce the speed of motor M¹ sufficiently to bring the same into step with motor M the limit switch LS is moved still further in the direction of arrow A to disengage contacts 35 and 35a. Switch 14 is then deenergized to include the set of resistances R¹² in the secondary circuit of motor M² to effect a further reduction in the speed of said motor. If this second speed reduction of motor M² is not sufficient to bring the same into step with motor M¹ movement of limit switch LS is continued in the direction of arrow A and main switch 1 is finally deenergized by disengagement of contacts 33 and 33a. The power connections for motor M² are thus interrupted and said motor then coasts until the speed thereof is below that of motor M² whereupon the limit switch LS is returned in the direction of arrow B to re-establish the energizing circuit for switch 11.

Upon movement of master switch MS into its reverse position reversing switch 2 is energized through the medium of contacts 16, 16a, 18a and 18 of said master switch and contacts 31 and 31a of limit switch LS. Also reversing switch 12 is energized through the medium of contacts 21, 21a, 19a and 19 of master switch MS and contacts 32 and 32a of limit switch LS. Upon response of reversing switch 2, switch 3 is energized through the medium of contacts 2b and contacts 26 and 26a of limit switch LS and switch 4 is energized through the medium of contacts 2c and contacts 21 and 27a of said limit switch. Upon response of reversing switch 12 switch 13 is energized through the medium of contacts 12b and contacts 31 and 31a of limit switch LS and switch 14 is energized through the medium of contacts 12c and contacts 36 and 36a of said limit switch. During reverse operation of motor M² arm 49 of switch 47 engages its associated contacts 49b and the solenoid operated pawl 44 is periodically energized by switch 46.

Upon reverse operation of motors M¹ and M² limit switch LS will be moved out of normal position in the direction of arrow A when motor M² operates at a lower speed than motor M¹ and in the direction of arrow B when motor M¹ operates at a lower speed than motor M². If the speed of motor M² is reduced for any reason during reverse operation of the motors, the speed of motor M¹ is controlled by the resistance control switches 3 and 4 and reversing switch 2 in the same manner as during forward operation of the motors, such switches being controlled by the contacts 26, 27 and 31 of limit switch LS and the cooperating movable contacts a. Also if the speed of motor M¹ is reduced for any reason during reverse operation of the motors, the speed of motor M² is controlled by the resistance switches 13 and 14 and reversing switch 12 in the same manner as during forward operation of the motors, such switches being controlled by contacts 36, 37 and 32 of limit switch LS and the cooperating movable contacts a.

What I claim as new and desire to secure by Letters Patent is:

1. The combination with two motors, a plurality of electromagnetic switches associated with each of said motors, certain for selectively establishing reverse power connections therefor and certain for controlling the speed thereof, a master switch for selectively controlling the reversing switches associated with both of said motors, means for controlling said speed regulating switches to provide for full speed operation of said motors upon starting thereof and a device for selectively controlling the reversing and speed regulating switches associated with said motors to maintain either of said motors substantially in step with the other of said motors upon slowdown of the latter motor, said device being operated by two differentially connected driving elements, one of said elements being driven directly by one of said motors, and an electromagnetically controlled ratcheting mechanism associated with the other of said motors for driving the other of said elements in a direction corresponding to the direction of operation of said latter motor.

2. The combination with two motors subjected individually to varying conditions of load, of a controller for each of said motors including starting and speed regulating means and means responsive to operation of either of said motors at a speed exceeding that of the other motor to control said starting and speed regulating means to effect slowdown of said former motor upon a given degree of angular displacement thereof with respect to said latter motor and to also effect temporary stopping of said former motor upon a wider degree of angular displacement thereof with respect to said latter motor.

3. The combination with two motors, of a plurality of electromagnetic switches associated with each of said motors, certain for selectively establishing reverse power connections therefor, and certain for controlling the speed thereof, a master switch for selectively controlling the reversing switches associated with both of said motors, means for controlling said speed regulating switches to provide for full speed operation of said motors upon starting thereof, and means responsive to slowdown of either of said motors for controlling the switches associated with the other of said motors to effect slowdown of said latter motor upon a given degree of angular displacement thereof with respect to said former motor and to effect temporary stopping of said latter motor upon a wider degree of angular displacement thereof with respect to said former motor.

4. The combination with two driving motors normally tending to operate at corresponding speeds and subjected individually to varying conditions of load, of a reversing controller for each of said motors including speed regulating means, a control device movable in opposite directions out of an intermediate off position to control said speed regulating means for slowdown of said motors selectively and two differentially connected elements for operating said device, one of said elements being mechanically connected to one of said driving motors, a reversible electromagnetically operated ratcheting mechanism associated with the other of said motors for driving the other of said elements to maintain the same in step with said latter motor, and means associated with said last mentioned motor for controlling the direction of operation of said ratcheting mechanism.

PAISLEY B. HARWOOD.